United States Patent [19]
Ditscheid

[11] 3,758,700
[45] Sept. 11, 1973

[54] INSULATING SPACE FOR HIGH-FREQUENCY COAXIAL CABLES AND ELECTRICAL FITTINGS ASSOCIATED WITH IT

[75] Inventor: Hans Leo Ditscheid, Refrath, Germany

[73] Assignee: Felten & Guilleaume Kabelwerke Aktiengesellschaft, Cologne Germany

[22] Filed: Oct. 6, 1971

[21] Appl. No.: 187,048

[30] Foreign Application Priority Data
Oct. 13, 1970 Germany.................. P 20 50 123.9

[52] U.S. Cl.................. 174/28, 138/114, 333/73 C
[51] Int. Cl. .......................................... H01b 11/18
[58] Field of Search...................... 174/28, 29, 16B, 174/99 B, 111, 15 C, DIG. 6; 138/111, 112, 113, 114; 333/84 R, 82 B, 97 S, 81 A, 73 C

[56] References Cited
FOREIGN PATENTS OR APPLICATIONS
922,240 11/1954 Germany ............................ 174/111

Primary Examiner—Bernard A. Gilheany
Assistant Examiner—A. T. Grimley
Attorney—Michael S. Striker

[57] ABSTRACT

For use in high-frequency coaxial transmission cables having a tubular outer conductor and at least one inner conductor axially supported therein, an insulating spacer to maintain said conductors in coaxially spaced relationship comprised of a hollow body portion from which extend radially outwardly and inwardly a plurality of contact members in form of flanges or ribs. The contact members are axially and/or circumferentially offset from each other along the body portion and are adapted in operation of the cable to engage the inner and outer conductors of the cable. The body portion of the spacer may be a true cylinder or may be in the form of a hollow truncated cone for increased pressure resistance in instances where the cable is filled with pressurized gas.

11 Claims, 5 Drawing Figures

Patented Sept. 11, 1973

INVENTOR
HANS LEO GITTSCHEIN
BY
ATTORNEY

INSULATING SPACE FOR HIGH-FREQUENCY COAXIAL CABLES AND ELECTRICAL FITTINGS ASSOCIATED WITH IT

BACKGROUND OF THE INVENTION

The invention relates in general to an insulating spacer for coaxial cables and electrical fittings associated therewith. More particularly it relates to an improved insulating spacer for high-frequency coaxial transmission cables and associated fittings.

Coaxial cables, particularly such for high-frequency power transmission of 100 kW and more, in meter and decimeter wavelengths, are often designed so as to withstand operating temperatures in the range of above 100°C. The inner and outer conductors of the coaxial cables are usually spaced from each other by insulators disposed within the cable. These insulators are generally made of temperature-stable materials such as glass or ceramics, particularly magnesium silicate or aluminum oxide. Normally these materials are substantially rigid and inflexible. However, since the cable, due to transport and installation requirements, has to be flexible along its length, the insulation between inner and outer conductors is usually provided by employment of a plurality of axially spaced individual insulators.

During transmission of high-frequency power in the range of several hundred kW and in the presence of wave resistance in the range of 50 ohms, high operating voltages of several kilovolts occur between inner and outer conductors of the cable. Moreover, during switching and tuning procedures, high voltages occur which are often in the range of multiples of the normal operating voltage. Thus, the insulators must be designed to withstand the occurring voltage differences.

It is known from the art to improve the voltage resistance of insulating spacers for high-frequency coaxial cables by radially partitioning the insulators and placement of metalic inserts within the radial partitions to accommodate different voltage potentials. The cost of production and assembly of these insulators of known structure is considerable and they are unsuitable for economical production of large cable lengths. Furthermore, the known insulators of this type are not adaptable for installation in connectors and other electrical fittings associated with the cable, and particularly not for coaxial cables filled with pressurized gas, and in which the electrical fittings have to be pressure-tight.

SUMMARY OF THE INVENTION

Accordingly, a primary object of the present invention resides in the provision of an insulating spacer for high-frequency coaxial cables and electrical fittings associated therewith which is designed to withstand operating temperatures of above 100°C and which is particularly adaptable for pressure-tight installation and economical production in the provision of power transmission lines.

The present improved insulating spacer has been designed with particular consideration in regard to good voltage resistance, which normally is limited by the occurrence of glow discharge.

The above-defined object of the invention, and others which will occur hereafter, are accomplished by the provision of an improved insulating spacer having radial contact members or contact portions for engagement with the inner and outer conductor of the cable. The inner contact members are axially offset relative to the contact members for the outer conductor in vertical direction to the electrical field lines of the cable so that the same field lines do not intersect both inner and outer contact members of the spacer. (+)

In one embodiment of the invention, the improved insulating spacer is comprised of a hollow substantially cylindrical body portion which is provided with radially extending inner and outer contact members in the form of flanges or ribs which are axially offset with respect to each other. In consideration of obtaining a substantially undistorted electrical field, it has been found to be of advantage to maintain the radial spacing of the hollow (+) Field lines going through one of the contact members for the outer or the inner conductor than do not go over its whole further length through the material of the spacer, but over considerable length through air or pressurized gas avoiding safely high electrical field strength and glow discharge. cylindrical body portion of the spacer from the inner and outer conductor, respectively, at different dimensions. Additionally, it has been found to be of advantage to maintain the axial length of the cylindrical body portion between the inner and outer contact members at a dimension which is larger than the radial distance between the inner conductor and the outer conductor to thereby increase the free surface area of the insulator for improved heat transfer.

In a further embodiment of the invention, in applications in which the coaxial cable is filled with a pressurized gas, the hollow body portion of the insulating spacer of the invention is advantageously constructed in the form of a hollow truncated cone. The cone angle of the body portion of the truncated cone-shaped insulator of the present invention, for practical purposes, lies in a range of from 40° to 60°C.

When utilizing a hollow truncated cone structure for the insulating spacer of the present invention, preferably the wall cross-section of the body portion of the insulating spacer will be of steadily increasing thickness in the direction of increase in diameter of the spacer to further improve the resistance against mechanical stresses due to heat expansion and internal gas pressure.

The novel features which are considered as characteristic for the invention are set forth in particular in the appended claims. The invention itself, however, both as to its construction and its method of operation, together with additional objects and advantages thereof, will best be understood from the following description of specific embodiments when read in conjunction with the accompanying drawings.

DESCRIPTION OF THE PREFERRED EMBODIMENTS

Figure 1:
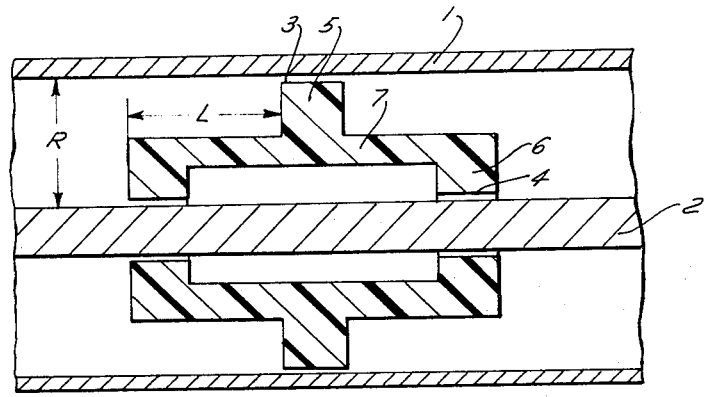
FIG. 1 is a longitudinal cross-section through a portion of a coaxial cable embodying the present improved internal insulating spacer, constructed of a hollow cylindrical body portion from which extend two radial inner contact flanges and one radial outer contact flange.

In FIG. 1 is shown, in cross-section, a portion of a representative coaxial cable structure schematically indicated by a tubular outer conductor 1 and inner conductor 2, the latter one of which being coaxially disposed within the outer conductor 1. The dimension of radial spacing between outer conductor 1 and inner conductor 2 is indicated by arrow R and which, of course, varies with any particular coaxial cable structure.

The insulating spacer of the present invention in FIG. 1 comprises a hollow, substantially cylindrical body portion 7 which is provided at both its ends with radially inwardly extending contact members 6 in the form of flanges and a radially outwardly extending contact member 5 likewise in the form of a flange and disposed intermediate the inner contact members 6. Radial content members 5 and 6 each have radial contact surfaces 3 and 4, respectively, which in cold, i.e. non-operating condition of the coaxial cable, are radially spaced a predetermined distance from the outer conductor and inner conductor, respectively, as shown. The predetermined normal spacing between contact surface 3 and outer conductor 1 and contact surfaces 4 and inner conductor 2, respectively, are, as is known, provided to accommodate for heat expansion during power transmission through the coaxial cable. Thus, under operating conditions the contact surfaces 3 of the insulator engage the internal surface of outer conductor 1 and contact surfaces 4 engage the radial outer surface of the inner conductor 2, to thereby maintain inner conductor 2 in predetermined coaxial relationship relating to outer conductor 1.

It will be noted that cylindrical body portion 7 of the improved insulating spacer is spaced at different radial distances from conductors 1 and 2, which has been found to be of advantage in order to maintain an undistorted pattern of the field lines representing the electrical field passing through the cable between conductors 1 and 2.

Figure 2:
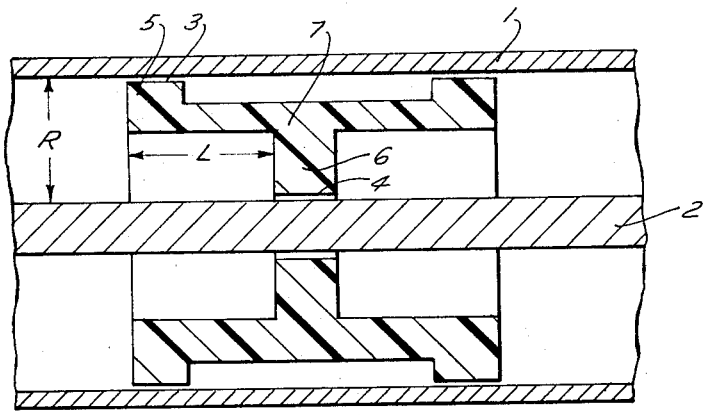
FIG. 2 is a view similar to FIG. 1, except that in this embodiment the insulating spacer is provided with two radial outer contact flanges and one radial inner contact flange.
Figure 5:
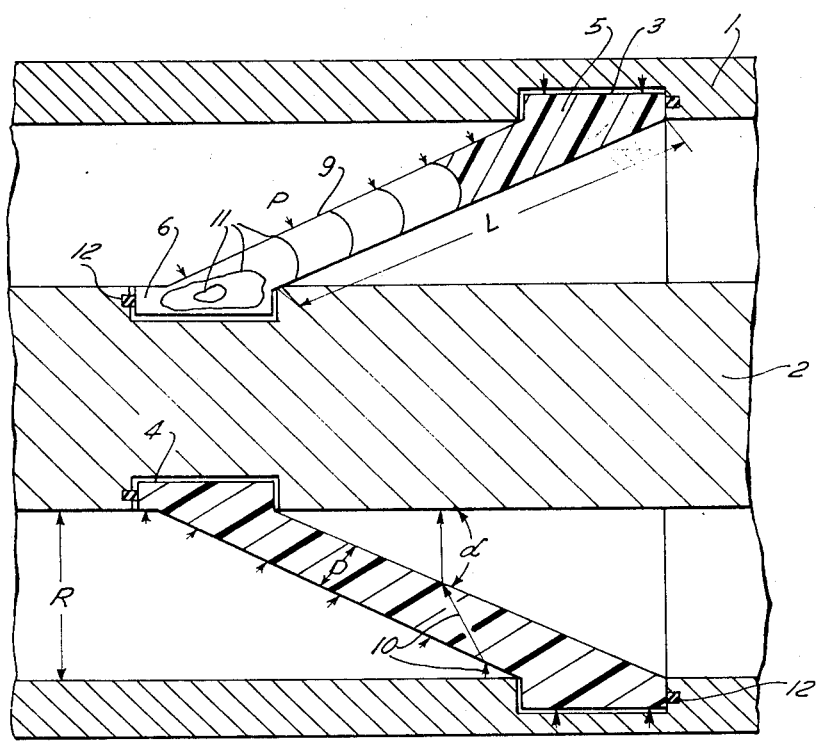
FIG. 5 illustrates a still further embodiment of the present invention, in which the insulating spacer is constructed in the form of a single hollow truncated cone of increasing wall thickness towards the larger diameter of the cone and which is installed in pressure-tight sealed relationship relative to the inner and outer conductors of the cable.

The dimension represented by the letter L indicates the axial length along body protion 7 of the insulating spacer between outer contact member 5 and inner contact members 6, or between members 6 and 6 in FIG. 1 or 5 and 5 in FIG. 2. L is preferably selected to be larger than the radial distance R between inner and outer conductor for maximum surface area in order to improve the heat transfer during power transmission.

The embodiment of FIG. 2 is similar to that illustrated in FIG. 1, except that the arrangement of inner and outer contact members of the insulating spacer is reversed from that shown in FIG. 1. The operational characteristic of this embodiment of the improved insulating spacer is otherwise the same as described for the embodiment shown in FIG. 1.

Figure 3:
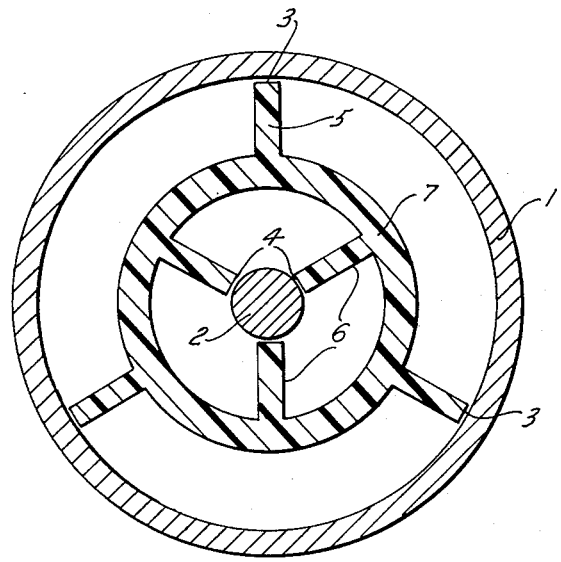
FIG. 3 is a transverse cross-section through a coaxial cable embodying an insulating spacer according to the present invention, which in this instance is provided with a plurality of radially inwardly extending contact members in form of ribs and a plurality of radially outwardly extending contact members likewise in the form of ribs and circumferentially spaced from each other.

With reference to the embodiment illustrated in FIG. 3, in this instance the hollow cylindrical body portion 7 of the improved insulating spacer is provided with a plurality of radially inwardly angularly spaced contact members 6 which are in the form of axial ribs extending from the inner surface of the body portion 7 towards the inner conductor 2. Similarly, a plurality of radial outer contact members 5 in the form of longitudinal ribs extend from the outer surface of body portion 7 outwardly towards the inner surface of outer conductor 1. It will be noted that outer contact members 5 in the embodiment of FIG. 3 are circumferentially spaced around body portion 7 in alternating staggered relationship relative to the spacing between inner contact members 6.

The offset positions of contact members 5 relative to contact members 6 of the insulating spacer of the present invention effectively prevents passing of the same electrical field lines through both inner and outer contact members.

The embodiment of FIG. 3 is similarly shown in cold, i.e. inoperative condition of the coaxial cable, indicating a predetermined preoperational spacing between contact surfaces 3 and outer conductor 1, and contact surfaces 4 and inner conductor 2, respectively, to accommodate for best expansion during operational power transmission through the cable.

Figure 4:
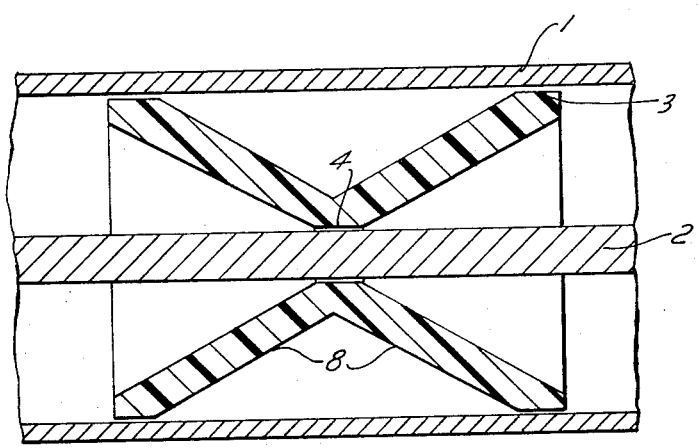
FIG. 4 is a transverse cross-section through a portion of a coaxial cable embodying an insulating spacer of the present invention constructed in the form of an integral dual hollow truncated cone in end-to-end relationship.

With reference now to FIG. 4, in this embodiment the improved insulating spacer of the present invention is constructed in the form of a pair of hollow truncated cones 8 which form an integral structure in end-to-end relationship. The truncated cone sections 8 are disposed with their smaller diameter converging towards each other for connecting immediately adjacent inner conductor 2. The integral connection of the smaller-diameter ends of the cone sections 8 define an internal contact member having a radial contact surface 4 normally, that is in inoperative condition of the cable, radially spaced a predetermined distance from inner conductor 2. The larger-diameter ends of cone sections 8 extend in opposite direction away from each other towards outer conductor 1 to form a pair of opposite outer contact members having radial contact surfaces 3 which are similarly radially spaced from inner contact surface 4, as shown, for engagement against outer conductor 1 when the cable is in operation. The embodiment shown in FIG. 4 is particularly adaptable for installation in gas-pressurized coaxial cables, since the cone structure of the insulating spacer provides maximum pressure absorption and stress resistance.

With reference now to FIG. 5, there is shown a further improved embodiment of insulating spacer in accordance with the present invention and embodying a cone-type body portion. This embodiment is illustrated as installed in a coaxial cable extending towards the left of the Figure, and which in practice is provided with an electrical fitting (not shown) normally disposed at the right of the Figure. The coaxial cable is similarly indicated by an outer conductor 1 and inner conductor 2, as previously shown.

The improved insulating spacer of the present invention, in this instance, is comprised of a single hollow truncated cone member 9 whose body portion extends angularly between inner conductor 2 and outer conductor 1. As illustrated, the wall thickness D of cone-type body portion 9 increases in cross-section towards the larger-diameter end of the cone structure.

The inner smaller-diameter of the cone-type insulating spacer shown in FIG. 5 is provided with a radially inwardly extending flange portion which in assembly extends into a complementary circumferential groove provided around inner conductor 2, to thereby axially retain this end of the insulating spacer on the inner conductor. The internal radial flange of the insulating spacer has an inner radial contact surface 4 which normally is spaced from the radial surface of inner conductor 2 for the same reasons described in connection with the previous embodiments.

A seal member 12 is provided disposed within the groove around radial conductor 2 for sealing against the lateral outer surface of the reduced-diameter end of the cone-type insulating spacer.

The opposite larger-diameter end of the cone-type insulating spacer is provided with a radially outwardly extending flange type contact member 5 which, similarly, is adapted for retainment within an internal radial groove provided in the inner surface of outer conductor 1 to axially retain this end of insulating spacer 9. Outer radial contact flange 5 is similarly provided with a radial contact surface 3 normally spaced a small distance from the surface of outer conductor 1, as previously described. Similarly, this end of the insulating spacer is sealed against the interior of the cable by a radial sealing member 12.

As indicated in FIG. 5, the axial length L along the body portion 9 of the conical-type insulating spacer is substantially larger than the dimension R indicating the radial distance between outer conductor and inner conductor 2, for the same reasons previously mentioned in connection with the description of the embodiment in FIG. 1.

In operation, the coaxial cable 1, 2 (to the left of the conical insulating spacer 9) will be filled with pressurized gas, as is known in certain high-frequency power transmission lines. The direction of the pressure forces of the gas within the coaxial cable are indicated by the arrows P. These pressure forces in axial and radial direction are directed against the external surface of the conical insulating spacer 9, that is from the left to the right in the Figure. In operation of the coaxial cable, the internal gas pressure forces and ensuing heat expansion cause the contact surfaces 3 and 4 of the conical insulating spacer to fully engage within their associated grooves of the external and internal conductors. At the same time a pressure-tight sealing engagement is obtained at opposite ends of the insulating spacer by means of sealing members 12, to thereby effectively prevent gas leakage across the insulating spacer and through the associated electrical fitting (not shown) which in practice is attached to the right-hand side of the insulating spacer in the Figure.

It will be appreciated that the truncated conical construction of the insulating spacer of the present invention as illustrated in FIG. 5 substantially approximates a semispherical shell form which, as is known, is best suited to withstand maximum pressure loads upon its outer surface.

The reference numeral 11 indicates isothermal lines which, during operation of the cable, occur within the material structure of the conical insulating spacer.

In summary, the structure of the present invention as shown and described in the specification obtains the following advantages: Most of the field lines 10 representing the electrical field passing through the coaxial cable are directed over a relatively long gas or air space. By this, any high local field currents are effectively prevented which otherwise, that is in the prior-art constructions, readily occur between the insulating spacers and the conductors. With the present invention it is now possible without danger of locally occurring glow discharges, to predetermine the necessary amount of expansion space between the contact surfaces of the insulating spacer and the conductors in such a manner as to eliminate any additiional mechanical stresses to which the material of the insulating spacer may be subjected due to heat expansion. The predetermined spacings between the insulating spacer and the surfaces of the conductors do n ot need to be meta-lized or provided with inserts of elastic insulating material for protection against glow discharge as proposed in the known structure. This effectively increases the protection against glow discharge and permits operation of a gas-filled coaxial cable at reduced operation pressures to thereby reduce operating costs.

Mechanical stresses due to temperature differences within the insulating spacers caused by the normally higher temperature of the inner conductor relative to the outer conductor, have been substantially reduced, since on one hand the temperature drop per unit length as indicated by isothermal lines 11 is substantially reduced and, on the other hand, the areas of lower temperature are not located not above, but to the side of the areas of the spacer which experienced heat expansion. Similarly, heat transfer due to electrical power dissipation has been considerably improved dur to increased surface area of the present improved insulating spacer.

As previously mentioned, the construction of the present improved insulating spacer in the form of a hollow truncated cone provides a most advantageous approximation of a hemispherical shell which, as is known in the art, is particularly well suited for absorption of high pressure forces.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of the invention and, therefore, such adaptations should and are intended to be comprehended within the meaning and range of equivalence of the following claims.

What is claimed as new and desired to be secured by Letters Patent is set forth in the appended claims.

I claim:

1. For use in high frequency coaxial cables having an inner conductor and an outer conductor coaxially surrounding said inner conductor and defining with the latter an uninterrupted space, a spacer disposed within said outer conductor around said inner conductor, said spacer comprising a body portion surrounding said inner conductor spaced therefrom and internal and external contact portions integral with said body portion, said internal and external contact portions having contact surfaces respectively arranged along a first and along a second cylindrical surface, said first cylindrical surface having a diameter greater than the outer surface of said inner conductor and said second cylindrical surface having a diameter smaller than the inner surface of said outer conductor in cold condition of said spacer, said contact surfaces being adapted to respectively engage said inner and outer conductor when said spacer is heated during operation of said cable, said internal and external contact portions being offset with respect to each other in such a manner that the lines of the electrical field between said inner and outer conductor which intersect the internal contact portions will not pass through the external contact portions and vice versa, said spacer consisting exclusively of insulating material.

2. A spacer as defined in claim 1, wherein said body portion is in the form of a hollow cylinder substantially coaxially arranged with said inner and outer conductor and wherein said internal and external contact portions are constituted by annular flanges displaced in axial direction of said body portion and respectively projecting inwardly and outwardly from said body portion.

3. A spacer as defined in claim 2, wherein said spacer comprises three radially projecting annular flanges, two of said falnges being arranged on opposite ends of said hollow cylinder and the third being arranged mid-way between said ends and projecting therefrom in a direction opposite to that of said two flanges.

4. A spacer as defined in claim 3, wherein two flanges project radially outwardly from said hollow cylinder and said third flange projects radially inwardly.

5. A spacer as defined in claim 2, wherein the radial length of said internal contact portions differ from that of said external contact portions.

6. A spacer as defined in claim 2, wherein the axial length of said body portion between said inwardly and outwardly projecting flanges is greater than the radial distance between the inner and the outer conductor.

7. A spacer as defined in claim 2, wherein said body portion is in the form of a hollow cylinder arranged substantially coaxially with the inner and outer conductor and wherein said external contact portions are constituted by a plurality of ribs projecting radially outwardly from and in the axial direction of said hollow cylinder and said internal contact portions being constituted by a plurality of ribs projecting radially inwardly from and in the axial direction of said cylinder and being circumferentially offset with respect to said external contact portions.

8. A spacer as defined in claim 1, wherein said body portion comprises a pair of hollow truncated cones facing each other at the small diameter ends and wherein said internal contact portion is constituted by a portion integrally connecting said cones at said smaller diameter ends and said external contact portions are constituted by the end portions of said cones at their large diameter ends.

9. A spacer as defined in claim 8, wherein the wall thickness of each cone increases from the small to the large diameter end.

10. A spacer as defined in claim 1, wherein said body portion is constituted by a hollow truncated cone and wherein said external and internal contact portions are constituted by end portions of said cone at said large and small diameter ends, respectively.

11. A spacer as defined in claim 10, wherein the wall thickness of said cone increases from the small to the large diameter end.

* * * * *